US011872777B2

(12) United States Patent
Marchal et al.

(10) Patent No.: US 11,872,777 B2
(45) Date of Patent: Jan. 16, 2024

(54) METHOD FOR MANUFACTURING A COMPONENT MADE OF A COMPOSITE MATERIAL WITH A REINFORCED MATRIX, AND DEVICE FOR THE IMPLEMENTATION THEREOF

(71) Applicants: SAFRAN, Paris (FR); SAFRAN AIRCRAFT ENGINES, Paris (FR)

(72) Inventors: Yann Didier Simon Marchal, Moissy-Cramayel (FR); Dominique Marie Christian Coupe, Moissy-Cramayel (FR); Bruno Jacques Gérard Dambrine, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 126 days.

(21) Appl. No.: 17/430,466

(22) PCT Filed: Jan. 31, 2020

(86) PCT No.: PCT/FR2020/050166
§ 371 (c)(1),
(2) Date: Aug. 12, 2021

(87) PCT Pub. No.: WO2020/178492
PCT Pub. Date: Sep. 10, 2020

(65) Prior Publication Data
US 2022/0111606 A1    Apr. 14, 2022

(30) Foreign Application Priority Data

Feb. 13, 2019 (FR) ..................................... 1901449

(51) Int. Cl.
*B29C 70/02* (2006.01)
*B29C 70/48* (2006.01)
(Continued)

(52) U.S. Cl.
CPC ............ *B29C 70/48* (2013.01); *D03D 15/275* (2021.01); *D03D 25/005* (2013.01); *D06M 11/74* (2013.01);
(Continued)

(58) Field of Classification Search
CPC ........ B29C 70/386; B29C 70/388; B29C 70/48
See application file for complete search history.

(56) References Cited

U.S. PATENT DOCUMENTS 3,862,475 A * 1/1975 Illman ...................... D02H 5/02
28/178
4,025,993 A * 5/1977 Kuroda .................... D02H 5/02
28/183
(Continued)

FOREIGN PATENT DOCUMENTS

| EP | 1 526 285 A1 | 4/2005 |
| WO | WO 2005/075048 A1 | 8/2005 |
| WO | WO 2006/136755 A2 | 12/2006 |
| WO | WO 2015/184151 A1 | 12/2015 |

OTHER PUBLICATIONS

Rojas, G.M., Processing and Evaluation of a Carbon Fiber/Epoxy Composite Reinforced in the Interlaminar Region with Carbon Nanotubes and Nanofibers, Master of Science Thesis, Rice University, 133 pages. (Year: 2007).*
(Continued)

*Primary Examiner* — Matthew J Daniels
(74) *Attorney, Agent, or Firm* — Pillsbury Winthrop Shaw Pittman LLP

(57) ABSTRACT

A process for manufacturing a composite material component including a fiber reinforcement based on carbon fibers densified by a matrix, includes successively producing a fiber structure by multilayer three-dimensional weaving, placing the fiber structure in a closed mold, and injecting a resin into the mold, and wherein, during the weaving of the
(Continued)

fiber structure, the process further includes spraying carbon nanoparticles onto the carbon fibers.

4 Claims, 1 Drawing Sheet

(51) Int. Cl.
  *D03D 15/275* (2021.01)
  *D03D 25/00* (2006.01)
  *D06M 11/74* (2006.01)
  *B29K 307/04* (2006.01)

(52) U.S. Cl.
  CPC ........ *B29C 70/021* (2013.01); *B29K 2307/04* (2013.01)

(56) References Cited

U.S. PATENT DOCUMENTS 4,107,381 A * 8/1978 Butzow .................... F16L 9/16
  428/113
2008/0286564 A1 11/2008 Tsotsis

OTHER PUBLICATIONS

Badawi, S.S., Development of the Weaving Machine and 3D Woven Spacer Fabric Structures for Lightweight Composites Materials, Doctor of Philosophy Dissertation, Technical University of Dresden, 168 pages. (Year: 2008).*
International Search Report as issued in International Patent Application No. PCT/FR2020/050166, dated May 25, 2020.

* cited by examiner

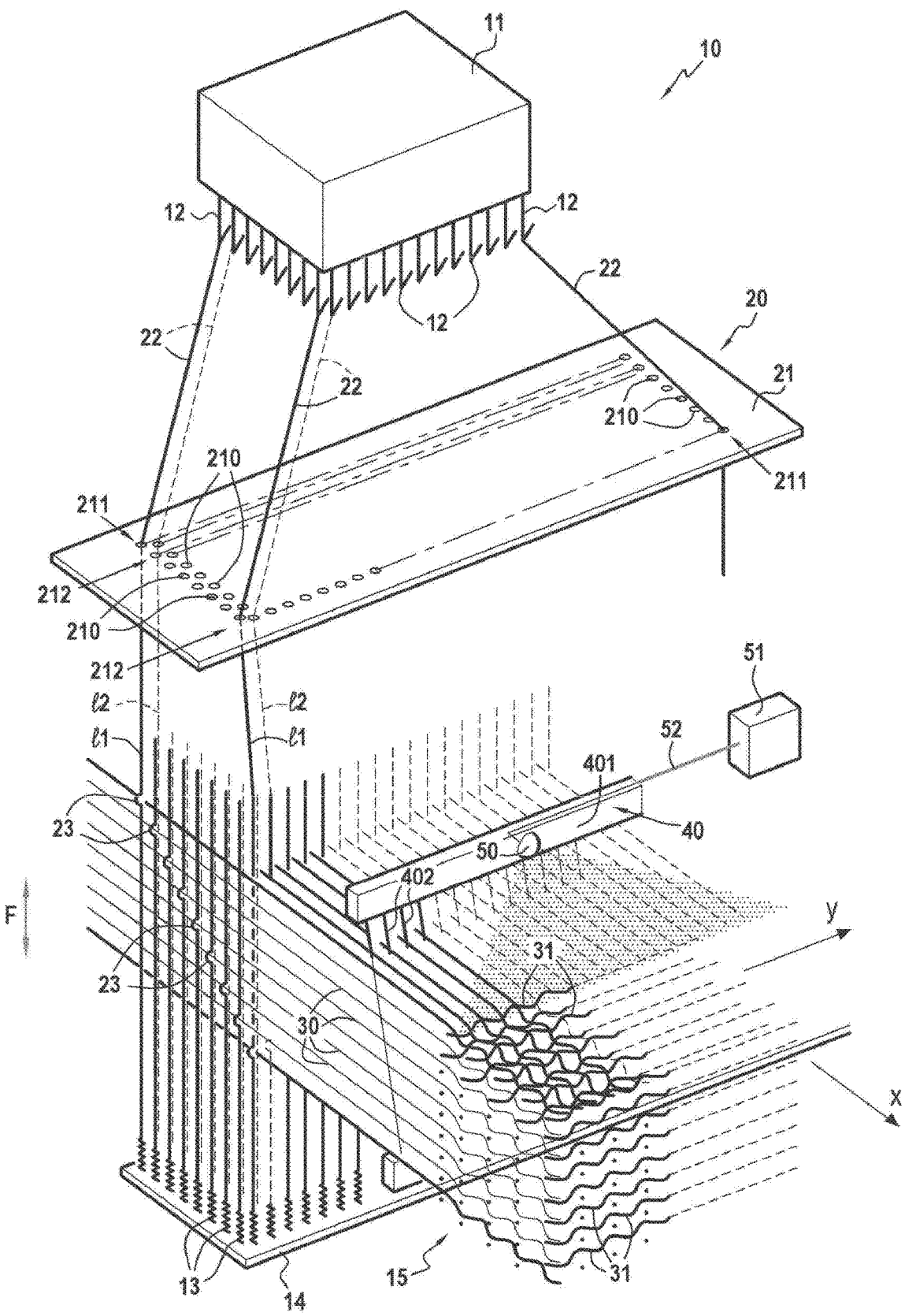

METHOD FOR MANUFACTURING A COMPONENT MADE OF A COMPOSITE MATERIAL WITH A REINFORCED MATRIX, AND DEVICE FOR THE IMPLEMENTATION THEREOF

CROSS-REFERENCE TO RELATED APPLICATIONS

This application is the U.S. National Stage of PCT/FR2020/050166, filed Jan. 31, 2020, which in turn claims priority to French patent application number 1901449 filed Feb. 13, 2019. The content of these applications are incorporated herein by reference in their entireties.

TECHNICAL FIELD

The invention relates to the manufacture of a component made of a composite material comprising a fiber reinforcement based on carbon fibers densified by a matrix.

More precisely, it relates to the manufacture of composite material components for turbomachinery from a fiber structure obtained by three-dimensional weaving of carbon fibers and densified by a reinforced matrix.

PRIOR ART

The production of composite material components for turbomachinery, such as blades for gas turbine engines, has already been proposed. Reference may be made, for example, to document EP 1 526 285 which describes the manufacture of a fan blade by producing a fiber preform by three-dimensional (3D) weaving and densifying the preform with an organic matrix.

As used herein, "3D weaving" is understood to mean a multilayer weave using several layers of weft threads and several layers of warp threads, with warp threads interlinking weft threads of different layers.

Typically, these organic matrix composite (OMC) components are manufactured from a fiber structure obtained by 3D weaving, this fiber structure being placed in a closed mold before injecting therein a resin at least until rigidification (or consolidation) of the preform.

It has been shown that when the composite material components thus obtained are damaged, the initial level of damage is in the resin. This initial level of damage is a fundamental design parameter of the component because it is directly related to the material's ability to withstand loads throughout its service life.

Increasing the initial level of damage of the component therefore either increases the service life of the component or allows the component to be lightened by allowing it to be designed with a higher loading level.

To this end, to increase the initial level of damage of the component, it is possible to modify the chemical formulation of the resin used to reinforce it. However, this possibility is limited by the fact that it requires a complete characterization of the composite material manufactured, which proves to be time consuming and costly. Moreover, this characterization of the composite material is usually done to the detriment of other properties of the resin (temperature resistance, etc.).

DISCLOSURE OF THE INVENTION

The purpose of the invention is therefore to propose a process for manufacturing a composite material component that increases the level of initial damage of the component without changing the chemical formulation of the resin.

This goal is achieved by virtue of a process for manufacturing a composite material component comprising a fiber reinforcement based on carbon fibers densified by a matrix, the process comprising successively producing a fiber structure by multilayer three-dimensional weaving, placing the fiber structure in a closed mold, and injecting a resin into the mold, and wherein, in accordance with the invention, during the weaving of the fiber structure, the process further comprises spraying carbon nanoparticles onto the carbon fibers.

The present invention is remarkable in that it provides for reinforcing the resin used by adding carbon nanoparticles (carbon nanotubes or graphene) during the weaving of the fiber structure. This addition is carried out without changing the chemical formulation of the resin. It also avoids forming pockets of pure resin within the material. On the contrary, the invention allows carbon nanoparticles to be placed around each carbon fiber in order to reinforce them.

In this way, the nanoparticles added during the weaving of the fiber structure reinforce the resin without disturbing the woven structure and without changing the chemical formulation of the resin. As a result, the initial level of damage of the component can be increased without detriment to other properties of the resin.

The weaving of the fiber structure can be performed using a loom. In this case, the spraying of carbon nanoparticles onto the carbon fibers is preferably performed at a shed opening created by lifting certain carbon threads from others.

Similarly, the process may further comprise spraying carbon nanoparticles onto the fiber structure before it is placed in the mold. This spraying avoids filtration phenomena by directly positioning the nanoparticles before the injection step. The level of initial damage to the component is further increased.

The invention also has as its subject matter a device for carrying out the process as defined above, comprising a loom for producing a fiber structure by multilayer three-dimensional weaving, the loom comprising: a harness consisting of a stuffing board and a plurality of heddles into which warp threads are inserted, each heddle being animated by a vertical oscillation movement to lift certain warp threads in order to create a shed opening allowing the introduction of weft threads; a comb provided with teeth to allow the distribution of the warp threads and the packing of the weft threads after their passage between the warp threads; and means for spraying carbon nanoparticles mounted on the comb.

The spraying means may comprise an injection nozzle mounted on a frame of the comb and which is connected by a pipe to a reservoir of carbon nanoparticles.

Alternatively, the spraying means can be formed by comb teeth that are hollow and are connected to a reservoir of carbon nanoparticles.

Again alternatively, the spraying means comprise an injection nozzle mounted on bars holding the fiber structure at the weaving point and which is connected by a pipe to a reservoir of carbon nanoparticles.

BRIEF DESCRIPTION OF THE DRAWINGS

FIG. 1 is a schematic view showing a loom for carrying out the process according to the invention.

DESCRIPTION OF THE EMBODIMENTS

The invention relates to a process for manufacturing a composite material component, in particular a turbomachine component such as, for example, a fan blade, comprising a fiber reinforcement based on carbon fibers densified by an organic matrix.

In a known way, such a process comprises successively producing a fiber structure by multilayer three-dimensional weaving, placing the fiber structure in a closed mold, and injecting a resin into the mold, characterized in that during the weaving of the fiber structure.

As used herein, "three-dimensional (3D) weaving" is understood to mean a multilayer weave using several layers of weft threads and several layers of warp threads, with warp threads interlinking weft threads of different layers. Different types of 3D weave patterns can be used, for example interlock, multi-satin, multi-woven, multi-serge weaves. Particular reference may be made to document WO 2006/136755, the contents of which are incorporated herein by reference.

The deposition of the matrix in the fiber structure thus formed is carried out by maintaining the structure in the mold at least until rigidification (or consolidation) of the structure.

The type of matrix is chosen according to the intended application, for example an organic matrix obtained in particular from a polymer matrix precursor resin such as an epoxy, bismaleimide or polyimide resin, or a carbon matrix or a ceramic matrix.

In the case of an organic matrix, the fiber structure is impregnated with a composition containing the matrix precursor resin, before shaping in a tool, or after shaping, the impregnation being carried out in the latter case, for example, by infusion or by a resin transfer molding (RTM) process.

In the case of a carbon or ceramic matrix, densification can be carried out by chemical vapor infiltration (CVI) or by impregnation with a liquid composition containing a carbon or ceramic precursor resin and pyrolysis or ceramization heat treatment of the precursor, these processes being well known per se.

The 3D weaving of the fiber structure is carried out by means of a loom such as that shown in FIG. 1.

In a known manner (see for example publication EP 1 526 285 A1), such a loom 10 is equipped with a Jacquard mechanism 11 supported by a superstructure not shown in FIG. 1.

The loom 10 also comprises a harness 20 consisting of a stuffing board 21 and control wires or heddles 22, each heddle 22 being connected at one end to a control hook 12 of the Jacquard mechanism 11 and at the other end to a return spring 13 attached to the frame 14 of the loom 10.

Each heddle 22 comprises an eye 23 through which a warp thread 30 passes. The heddles 22 and their associated eye 23 are animated by a substantially vertical oscillation movement represented by the double arrow F under the traction forces exerted respectively by the control hooks 12 and the return springs 13. The heddles 22 make it possible to lift certain warp threads 30 and thus create a shed 15 allowing the introduction of weft threads 31 thanks to a shuttle (not shown in FIG. 1).

The heddles 22 are spatially distributed according to the position of the holes 210 in the stuffing board 21, i.e., in a plurality of columns 211 and rows 212.

The density of the holes 210 in the stuffing board corresponds to the density of the fabric to be made, i.e., there is a spacing between each column of holes in the stuffing board equivalent to that present between each warp column in the fabric to be made.

The loom also comprises a comb 40 which is positioned at the shed 15 to allow the distribution of the warp threads 30 and the packing of the weft thread 31 after each shuttle passage. In a known way, it consists of a frame 401 carrying a series of thin taut cables 402 forming the comb teeth.

According to the invention, it is provided to increase the level of initial damage of the composite material component manufactured from such a process, without changing the chemical formulation of the resin used.

To this end, the invention provides for spraying carbon nanoparticles (carbon nanotubes or graphene, for example) onto the carbon fibers during the weaving of the fiber structure.

In practice, it is particularly advantageous to take advantage of the shed opening 15 created by the lifting of certain warp threads 30 by the heddles 22. Indeed, the shed 15 is an angular passage space that particularly facilitates spraying carbon nanoparticles onto the carbon fibers of the fiber structure.

As shown in FIG. 1, for example, an injection nozzle 50 may be positioned on the frame 401 of the comb 40 of the loom, this injection nozzle being directed towards the shed opening to reach a maximum of carbon fibers 30, 31.

In this configuration, the injection nozzle is advantageously connected to a reservoir 51 containing carbon nanoparticles via a pipe 52 running along the frame 401 of the comb.

In an alternative embodiment not shown, hollow teeth 402 of the comb may be used in order to circulate the carbon nanoparticles from the reservoir 51. In this alternative, the presence of the injection nozzle and the pipe is thus replaced by these hollow teeth.

In another alternative embodiment not shown, a carbon nanoparticle injection nozzle may be used, which is mounted at the level of the holding bars of the fiber structure, which typically allow the fabric to be held at the weaving point. This alternative thus allows the spraying of nanoparticles to be perfectly localized.

Furthermore, the level of initial damage to the composite material component can be further increased by adding to the previously described carbon nanoparticle injection process additional operations described below.

Still with the aim of further increasing the level of initial damage, it can also be envisaged, as an alternative or in addition to the preceding operation, to spray carbon nanoparticles directly onto the fiber structure before it is placed in the mold. This operation avoids the filtration phenomena mentioned previously.

The invention claimed is:

1. A process for manufacturing a composite material component comprising a fiber reinforcement based on carbon fibers densified by a matrix, the process comprising successively producing a fiber structure by multilayer three-dimensional weaving, placing the fiber structure in a closed mold, and injecting a resin into the mold, wherein during weaving of the fiber structure, the process further comprises spraying carbon nanoparticles onto the carbon fibers, the weaving of the fiber structure being performed using a loom, and the spraying of carbon nanoparticles onto the carbon fibers being performed at a shed opening created by lifting certain carbon threads from others, wherein the spraying is carried out using a comb or a spraying device mounted on the comb of the loom.

2. The process as claimed in claim 1, wherein the spraying device comprises an injection nozzle mounted on a frame of the comb and which is connected by a pipe to a reservoir of carbon nanoparticles.

3. The process as claimed in claim 2, wherein the spraying device is formed by comb teeth that are hollow and are connected to a reservoir of carbon nanoparticles.

4. The process as claimed in claim 2, wherein the spraying device comprises an injection nozzle mounted on bars holding the fiber structure at the weaving point and which is connected by a pipe to a reservoir of carbon nanoparticles.

\* \* \* \* \*